(12) United States Patent
Hillman

(10) Patent No.: US 7,437,599 B2
(45) Date of Patent: Oct. 14, 2008

(54) SYSTEM AND METHOD FOR EFFECTIVELY IMPLEMENTING AN IMMUNITY MODE IN AN ELECTRONIC DEVICE

(75) Inventor: Robert A. Hillman, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 510 days.

(21) Appl. No.: 11/058,136

(22) Filed: Feb. 15, 2005

(65) Prior Publication Data

US 2006/0184824 A1    Aug. 17, 2006

(51) Int. Cl.
*G06F 11/00* (2006.01)
(52) U.S. Cl. .......................................................... 714/6
(58) Field of Classification Search ...................... 714/6
See application file for complete search history.

(56) References Cited

U.S. PATENT DOCUMENTS

| | | | |
|---|---|---|---|
| 5,414,861 A * | 5/1995 | Horning | ..................... 365/229 |
| 5,436,854 A | 7/1995 | Takada et al. | |
| 5,450,561 A | 9/1995 | Ryan | |
| 5,513,337 A | 4/1996 | Gillespie et al. | |
| 5,644,754 A | 7/1997 | Weber et al. | |
| 6,154,830 A | 11/2000 | Sugimura | |
| 6,272,587 B1 | 8/2001 | Irons | |
| 6,728,834 B2 | 4/2004 | Stone et al. | |
| 7,263,631 B2 * | 8/2007 | VanBuren | ..................... 714/15 |
| 2004/0199813 A1 * | 10/2004 | Hillman et al. | ................ 714/13 |
| 2006/0036909 A1 * | 2/2006 | VanBuren | ..................... 714/15 |
| 2006/0117164 A1 * | 6/2006 | Coxe et al. | ..................... 712/15 |

* cited by examiner

*Primary Examiner*—Bryce P Bonzo
(74) *Attorney, Agent, or Firm*—Hensley Kim & Holzer, LLC

(57) ABSTRACT

A system and method for effectively implementing an immunity mode in an electronic device includes a processor module for executing processing tasks for the electronic device. The processor module includes processor information, such as processor states and processor data, for executing the processing tasks. The electronic device also includes a protected memory for storing electronic information in an optimally secure manner. An immunity manager may then perform protection procedures to store at least a portion of the vulnerable processor information into the protected memory in response to an immunity mode trigger event such as the processor module entering an idle state.

19 Claims, 7 Drawing Sheets

SYSTEM AND METHOD FOR EFFECTIVELY IMPLEMENTING AN IMMUNITY MODE IN AN ELECTRONIC DEVICE

CROSS-REFERENCE TO RELATED APPLICATIONS

This application relates to U.S. patent application Ser. No. 10/418,713, entitled "Self-Correcting Computer," filed on Apr. 7, 2003. The foregoing related application is commonly assigned, and is hereby incorporated by reference.

BACKGROUND SECTION

1. Field of Invention

This invention relates generally to techniques for effectively implementing electronic devices, and relates more particularly to a system and method for effectively implementing an immunity mode in an electronic device.

2. Description of the Background Art

Developing techniques for effectively implementing electronic devices is a significant consideration for designers and manufacturers of contemporary electronic systems. However, effectively implementing electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an electronic system that functions in a hazardous operating environment may benefit from an effective and robust implementation because of the detrimental effect of system malfunctions.

Certain operating environments require that electronic devices be extremely reliable. One such environment is the space environment. Electronic devices that may be placed into space, such as into Earth orbit, are typically not available for regular maintenance, and must therefore be guaranteed to perform for the life of the spacecraft. Therefore, an electronic device, such as a computer, mounted in or on a spacecraft should preferably be highly reliable and robust in its tolerance to faults, either external or internal.

Furthermore, objects in the space environment are subject to various types of radiation that may be harmful to certain device components. For example, a single radiation element may cause an upset (referred to as a single-event upset or SEU) of information in either a processor, a memory, or other components of an electronic device. An SEU may typically cause one or more digital bits within the electronic device to "flip" or change state. A computer in the space environment should preferably be robust with respect to such single-event upsets.

Due to growing demands on system resources, substantially increased data magnitudes, and certain critical or hazardous operating environments, it is apparent that developing new techniques for effectively implementing electronic devices is a matter of concern for related electronic technologies. Therefore, for all the foregoing reasons, developing effective systems for implementing and utilizing electronic devices remains a significant consideration for designers, manufacturers, and users of contemporary electronic systems.

SUMMARY

In accordance with the present invention, a system and method are disclosed for effectively implementing an immunity mode in an electronic device. In accordance with one embodiment of the present invention, a processor module of the electronic device initially functions in a normal processing mode. The processor module also monitors whether an immunity mode trigger has occurred by utilizing any appropriate technique(s).

The foregoing immunity mode trigger may be generated in response to any desired occurrence, state, or event. For example, an immunity mode trigger may result from the processor module entering an idle state. Alternately, the immunity mode trigger may be generated when certain predefined conditions occur, such as the detection of an exceptionally hazardous operating environment or a highly sensitive use of the electronic device. In addition, in certain embodiments, the immunity mode trigger may be affirmatively generated by a system user of the electronic device.

If no immunity mode trigger is detected, then the processor module may continue with normal processing. However, if an immunity mode trigger is detected, then, in accordance with the present invention, the processor module may utilize an immunity manager to enter an immunity mode during which one or more protection procedures may be performed to temporarily flush some or all of the vulnerable processor states and processor data from the processor module into a protected memory.

The immunity manager determines an appropriate latency level for the current immunity mode by utilizing any effective technique(s). For example, in certain embodiments, a particular type of immunity mode trigger may be associated with a predefined corresponding latency level. Alternately, latency levels may be dynamically determined by current conditions at the time of the immunity mode trigger.

Typically, a given latency level corresponds to the level of protection desired during a particular immunity mode, with a high latency level providing the maximum protection and a low latency level providing the minimum protection. In addition, a given latency level also correlates to the amount of processing disruption acceptable during a particular immunity mode, with a high latency level having the maximum disruption and a low latency level having the minimum disruption.

If the immunity manager determines that a low latency level is appropriate for the current protection procedure, then the immunity manager coordinates a minimal flush procedure to transfer a minimal amount of processor information from the processor module to the protected memory. The processor module may then continue with various processing tasks in the normal processing mode, and may retrieve the protected information from the protected memory as needed.

If the immunity manager determines that a medium latency level is appropriate for the current protection procedure, then the immunity manager coordinates a partial flush procedure to transfer a moderate amount of processor information from the processor module to the protected memory. The processor module may then continue processing various tasks in a normal processing mode, and may retrieve protected information from the protected memory as needed.

If the immunity manager determines that a high latency level is appropriate for the current protection procedure, then the immunity manager coordinates a complete protection procedure to transfer all processor information from the processor module to the protected memory. For example, the immunity manager initially coordinates a complete flush procedure of all processor states and processor data from the processor module to the protected memory. Next, the electronic device resets the processor(s) of the processor module. In accordance with the present invention, the processor module then may enter a pause mode during which no processing tasks are performed, and all protected processor information (processor states and processor data) remains safely in the protected memory.

The immunity manager monitors whether a restart trigger event has occurred by utilizing any effective means. The foregoing restart trigger event may be generated in response to any desired occurrence, state, or event. For example, a restart trigger event may result when the processor module leaves an idle state because one or more new unexecuted tasks require processing. Alternately, the restart trigger event may result when certain predefined hazardous operating conditions no longer exist. In addition, in certain embodiments, the restart trigger event may be affirmatively generated by a system user of the electronic device.

If the immunity manager fails to detect a restart trigger event, then the processor module may remain in the foregoing pause mode. However, if immunity manager detects a restart trigger event, then the immunity manager may coordinate a processor restoration procedure during which the protected processor information (e.g., processor states and processor data) is restored from the protected memory to the processor module for resuming normal processing functions. For at least the foregoing reasons, the present invention therefore provides an improved system method for effectively implementing an immunity mode in an electronic device.

DETAILED DESCRIPTION

The present invention relates to an improvement in implementing electronic devices. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing an immunity mode in an electronic device, and includes a processor module for executing processing tasks for the electronic device. The processor module includes processor information, such as processor states and processor data, for executing the processing tasks. The electronic device also includes a protected memory for storing electronic information in an optimally secure manner. An immunity manager may then perform protection procedures to store at least a portion of the vulnerable processor information into the protected memory in response to an immunity mode trigger event such as the processor module entering an idle state.

Figure 1:
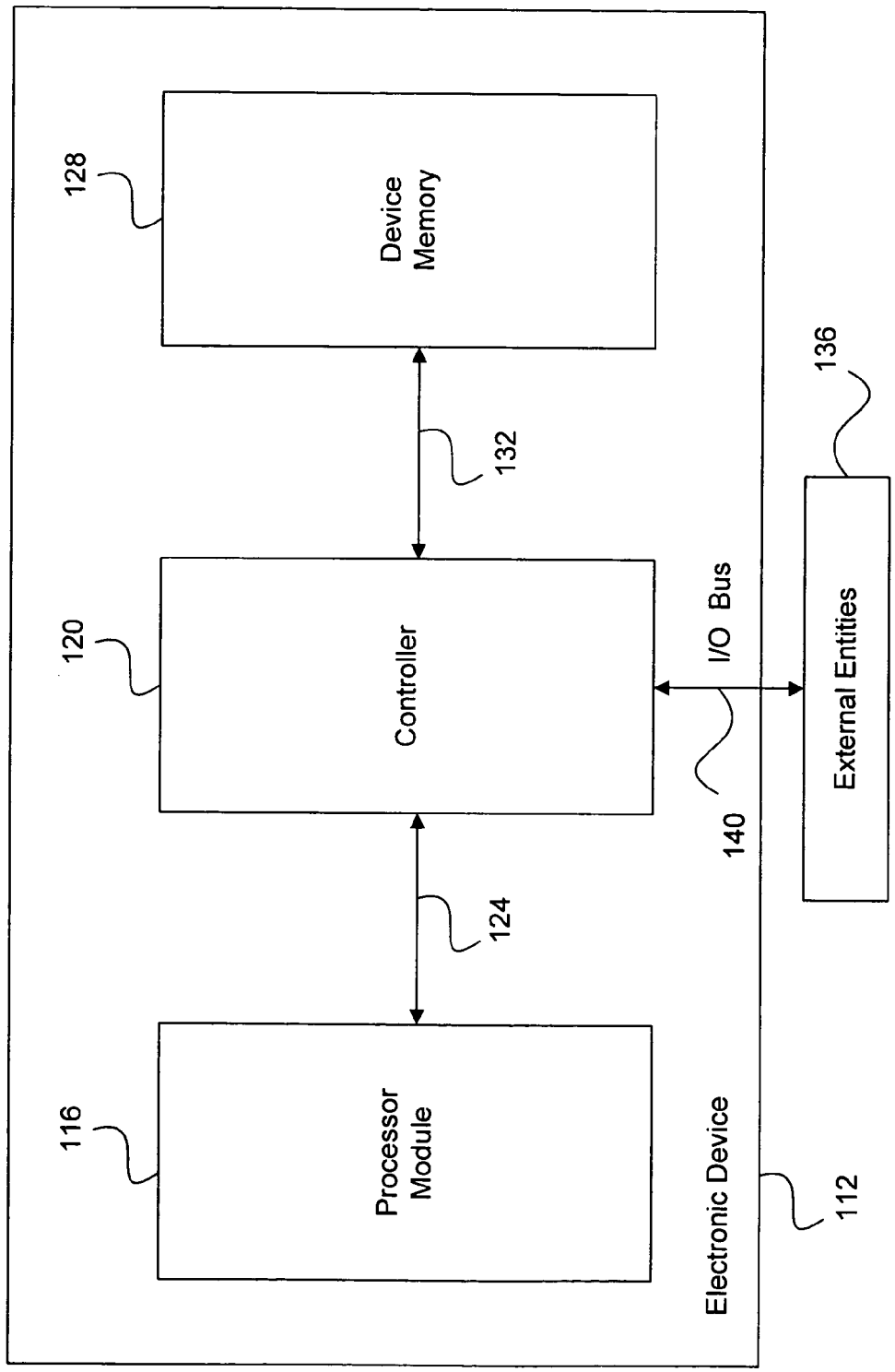
FIG. 1 is a block diagram of an electronic device, in accordance with one embodiment of the present invention.

Referring now to FIG. 1, a block diagram of an electronic device 112 is shown, in accordance with one embodiment of the present invention. In the FIG. 1 embodiment, electronic device 112 may include, but is not limited to, a processor module 116, a controller 120, and device memory 128. In alternate embodiments, electronic device 112 may be implemented using components and configurations in addition to, or instead of, certain of those components and configurations discussed in conjunction with the FIG. 1 embodiment.

In the FIG. 1 embodiment, processor module 116 may be implemented to include any appropriate and compatible processor device(s) that execute software instructions for controlling and managing the operation of electronic device 112. Processor module 116 is further discussed below in conjunction with FIG. 2. In the FIG. 1 embodiment, electronic device 112 may utilize controller 120 for bi-directionally coordinating communications for both processor module 116 and device memory 128. Electronic device 112 may also utilize controller 120 to communicate with various types of external entities 136 via input/output (I/O) bus 140. Controller 120 is further discussed below in conjunction with FIG. 3. In the FIG. 1 embodiment, device memory 128 may be implemented to include any combination of desired storage devices, including, but not limited to, read-only memory (ROM), random-access memory (RAM), and various other types of volatile and non-volatile memory. In the FIG. 1 embodiment, device memory 128 may include a protected memory that is implemented in a manner to optimally provide robust and secure storage of various types of information and data. Device memory 128 is further discussed below in conjunction with FIG. 4.

In certain embodiments, electronic device 112 may be utilized in special and demanding operating environments. For example, electronic device 112 may be utilized in a space operating environment as part of a spacecraft or other object in space. Commercial processors in space operating environments may experience bit upset vulnerability due to space radiation and other factors. This vulnerability is based upon various factors including the duty cycle of vulnerability, which may be defined as the percentage of time that digital bits in a processor are susceptible to a radiation upset. In conventional systems, when the operating system is idle (with no active processing tasks for a period of time), the processor still maintains most of the current processor elements, states, and data, thus making these elements, states, and data susceptible to upsets, even when processing computations are not currently being performed.

In accordance with the present invention, electronic device 112 may advantageously enter an immunity mode during which a protection procedure is performed to store some or all of the vulnerable processor states and processor data of processor module 116 into a protected, more immune memory device 128 while processor module 116 is idle. In one example, when processor module 116 is idle, the protection procedure may be performed to flush the processor states and processor data of processor module 116 into a robust and protected section of device memory 128.

In one embodiment of the immunity mode, electronic device 112 may then hold processor module 116 in a reset state, so that during this time period, the processor states and processor data are not susceptible to upsets or other corruption. Then, when a pre-defined restart trigger event occurs (such a need for more processing computations), the protected processor states and processor data may be restored, and processor module 116 may resume processing in a normal mode.

The foregoing technique provides several benefits. Electronic device 112 may exhibit lower power consumption characteristics because processor module 116 is held in reset and no processing is being performed. However, in certain embodiments, the processor module 116 may be placed into a low power mode which has lower power consumption that holding processor module 116 in reset. In addition, processor module 116 may have a significantly lower probability of bit errors in the processor data and processor registers because the processor states and processor data are being securely protected in device memory 128.

In certain embodiments, a subset of the foregoing technique may alternately be implemented. For instance, under certain pre-determined conditions, only the cached data from processor cache of processor module 116 may be flushed to device memory 128, and processor module 116 may then continue to function normally while retrieving processor data from device memory 128 to the local processor cache as needed. Since processor cache is typically a significant location of bit upsets, this technique could advantageously decrease upset rates and make processor module 116 considerably more robust and reliable.

In the FIG. 1 embodiment, electronic device 112 may therefore flush, reset, and subsequently restore processor states and processor data to processor module 116. However, in accordance with one embodiment of the present invention, electronic device 112 may enter a pause mode after the foregoing reset until such time that additional processing tasks are required or other predefined restart trigger events occur. The implementation and utilization of the FIG. 1 electronic device 112 is further discussed below in conjunction with FIGS. 2-7.

Figure 2:
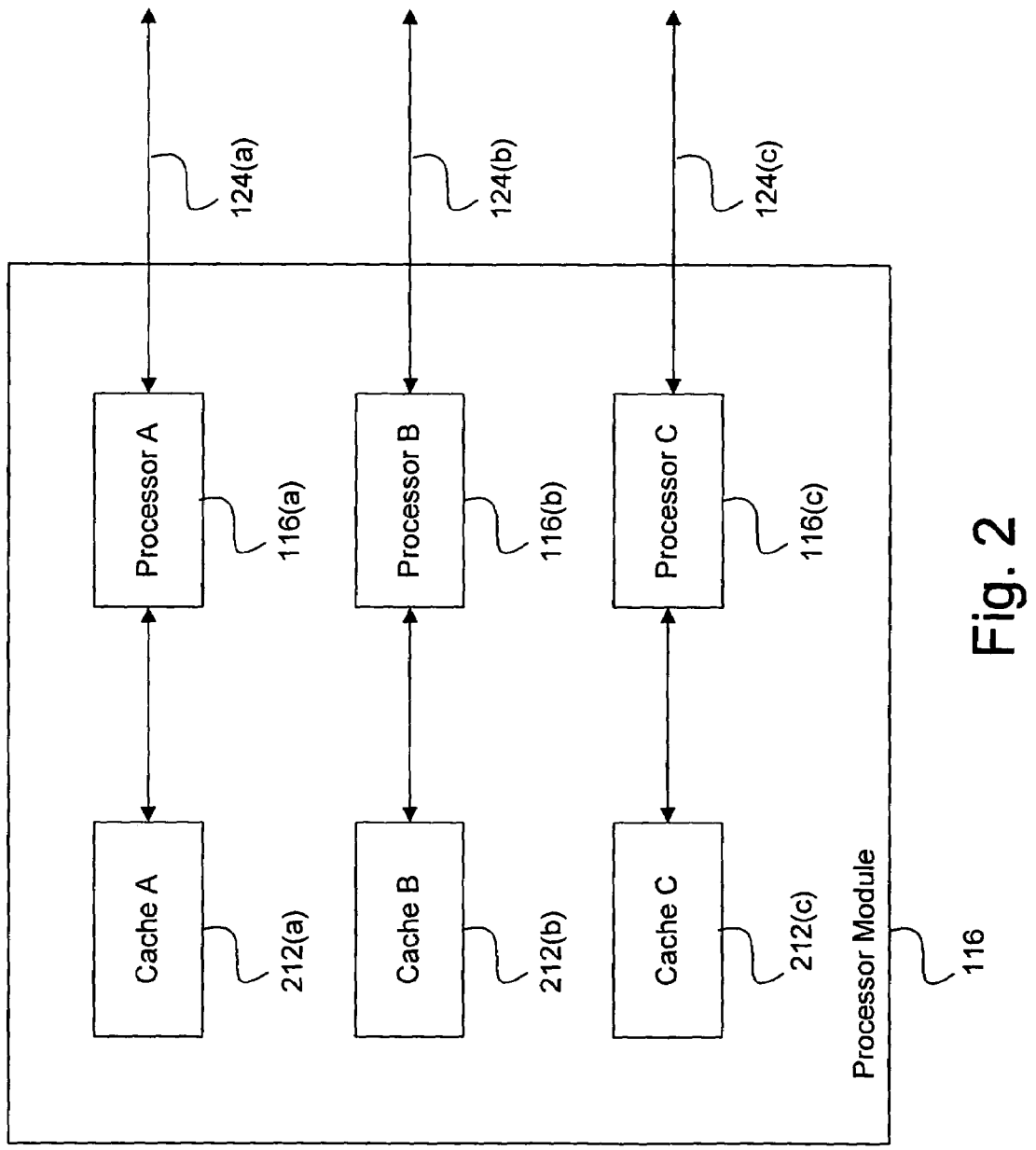
FIG. 2 is a block diagram for one embodiment of the processor module of FIG. 1, in accordance with the present invention.

Referring now to FIG. 2, a block diagram for one embodiment of the FIG. 1 processor module 116 is shown, in accordance with the present invention. In the FIG. 2 embodiment, processor module 116 may include a processor A 116(a) with a cache A 212(a), a processor B 116(b) with a cache B 212(b), and a processor C 116(c) with a cache C 212(c).

In alternate embodiments, processor module 116 may readily be implemented using components and configurations in addition to, or instead of, certain of those components and configurations discussed in conjunction with the FIG. 2 embodiment. For example, in other embodiments, processor module 116 may be implemented with any desired number of processors 116 with corresponding caches 212. In certain embodiments, processor module 116 may readily be implemented with just a single processor 116 with associated cache 212.

In the FIG. 2 embodiment, processor module 116 is implemented using a triple redundancy implementation in which processors 116(a-c) operate in lock-step synchronization by executing identical program instructions at precisely the same time. Each processor 116 may therefore provide identical output signals and other operating parameters on respective output paths 124(a-c). If the output signals of any processor 116(a-c) differs from the output signals of the other two processors, then electronic device 112 may halt the differing processor, and may perform a resynchronization procedure to restart the halted processor in synchronization with the other two processors.

Processors 116(a-c) each typically include a substantial amount of digital information referred to herein as processor states. In addition, each processor 116(a-c) may be associated with corresponding processor cache 212 that typically includes digital information referred to herein as processor data. Because of the immunity mode and the protection procedures discussed above in conjunction with FIG. 1, in certain embodiments, processors 116(a-c) may be economically implemented with standard commercially-available processor devices.

In certain embodiments, only part of the processor states are restores after being flushed to memory. As the processor module 116 runs, it start reloading the cache. Processor module 116 may be run at a relatively higher speed (e.g., 800 MHz) to perform tasks more rapidly so that it can be in the immunity mode for a longer percent of time. The operation of processor module 116 is further discussed below in conjunction with FIGS. 6 and 7.

Figure 3:
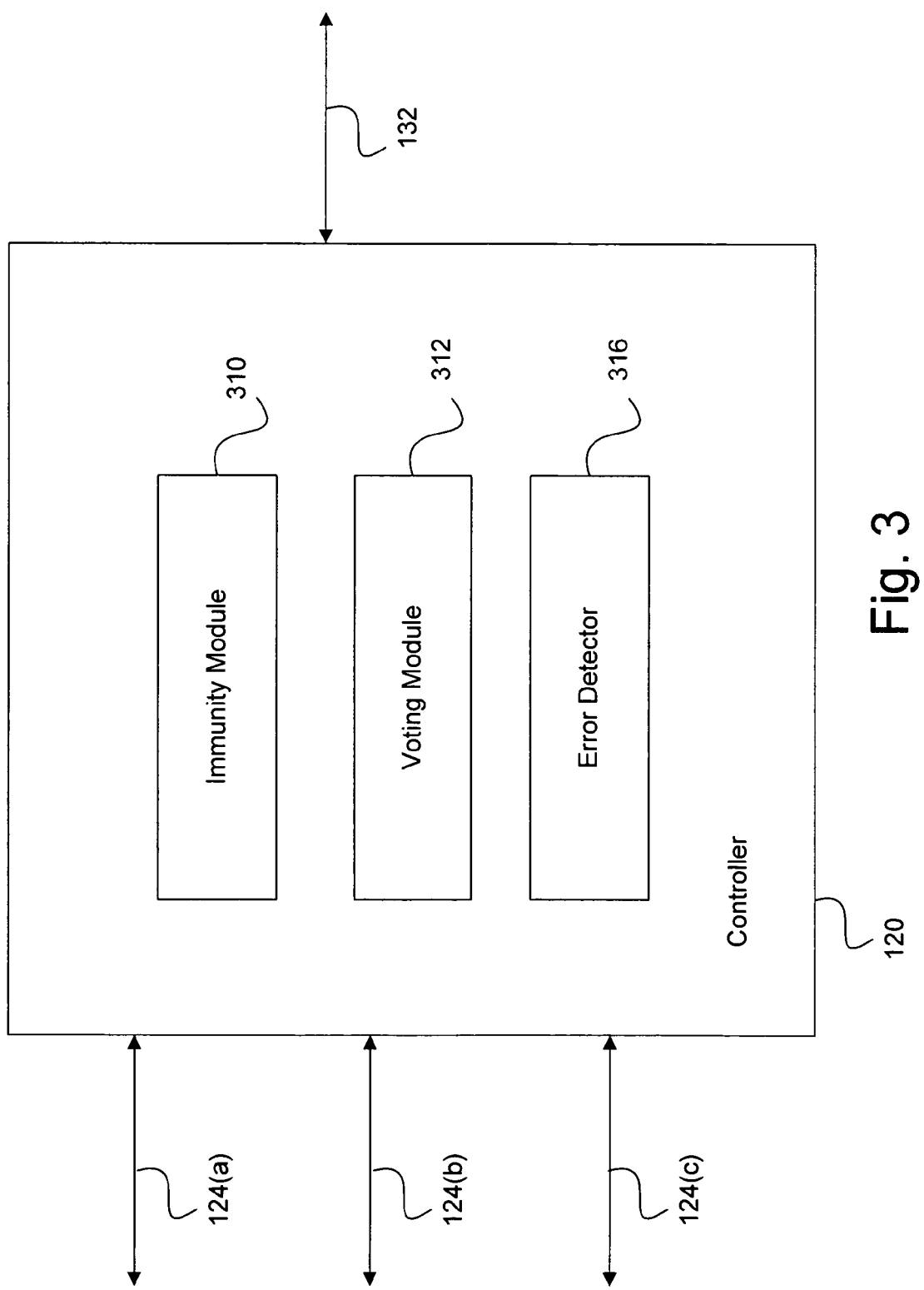
FIG. 3 is a block diagram for one embodiment of the controller of FIG. 1, in accordance with the present invention.

Referring now to FIG. 3, a block diagram for one embodiment of the FIG. 1 controller 120 is shown, in accordance with the present invention. In the FIG. 3 embodiment, controller 120 includes, but is not limited to, an immunity module 310, a voting module 312, and an error detector 316. In alternate embodiments, controller 120 may readily include other components in addition to, or instead of, certain of those components discussed in conjunction with the FIG. 3 embodiment.

In the FIG. 3 embodiment, controller 120 may utilize immunity module 310 to coordinate certain transfer functions and other tasks for the immunity mode and protection procedures discussed above in conjunction with FIG. 1. In the FIG. 3 embodiment, controller 120 may utilize voting module 312 to analyze output signals from the three processors 116(a-c) discussed above in conjunction with FIG. 2. Voting module 312 may then determine a majority signal from the three output signals from processor module 116, and may store the majority signal into device memory 128 via path 132.

In the FIG. 3 embodiment, controller 120 may utilize error detector 316 to identify an unsynchronized processor whose output signal is not the same as with the foregoing majority signal. When the output signals of the unsynchronized processor differ from the majority signal of the other two processors, then electronic device 112 may halt the unsynchronized processor, and may perform a resynchronization procedure to restart the halted processor with restored processor states and processor data from the majority signal of the other two processors. The utilization of controller 120 is further discussed below in conjunction with FIGS. 6 and 7.

Figure 4:
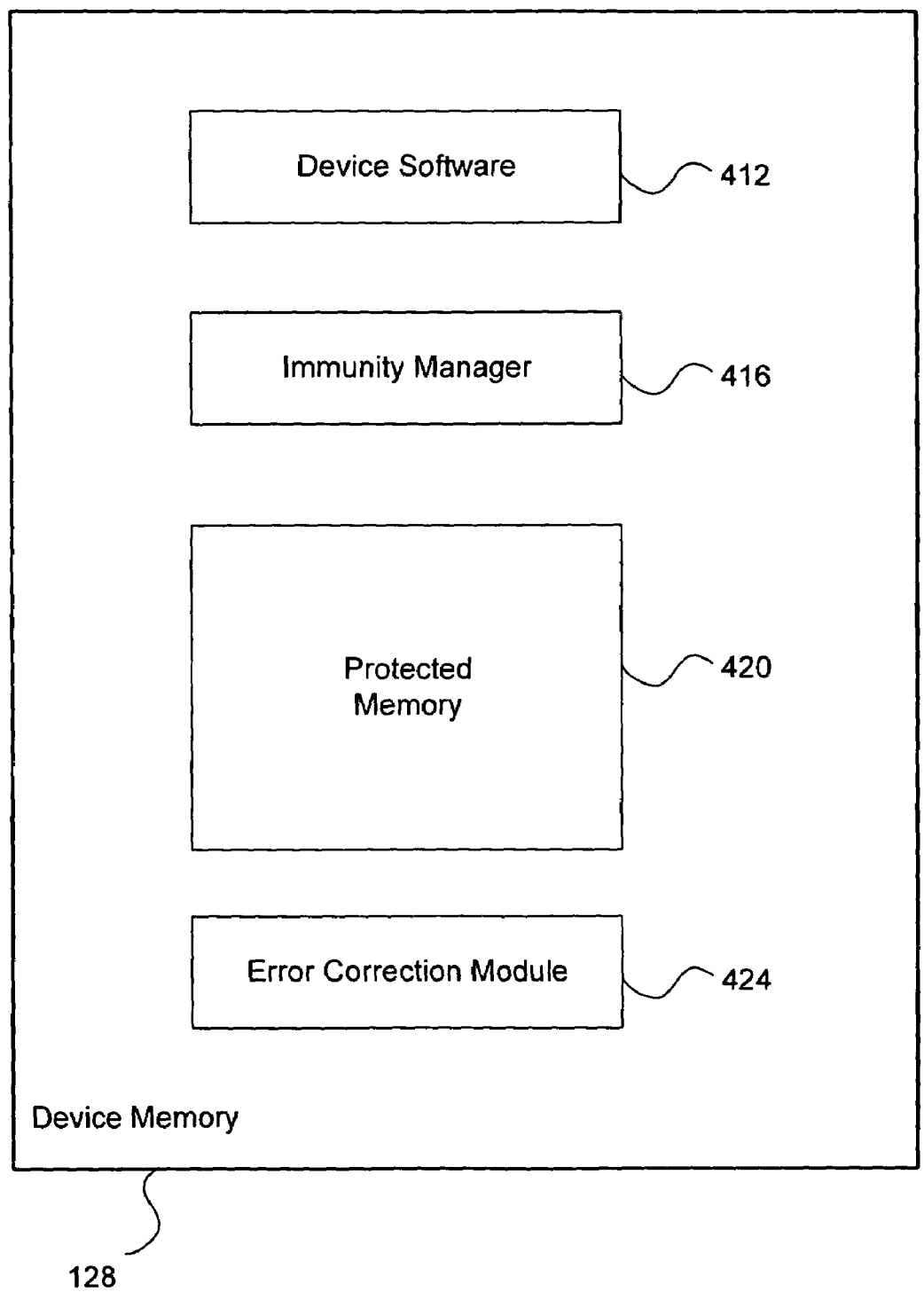
FIG. 4 is a block diagram for one embodiment of the device memory of FIG. 1, in accordance with the present invention.

Referring now to FIG. 4, a block diagram for one embodiment of the FIG. 1 device memory 128 is shown, in accordance with the present invention. In the FIG. 4 embodiment, device memory 128 includes, but is not limited to, device software 412, an immunity manager 416, protected memory 420, and an error correction module 424. In alternate embodiments, device memory 128 may readily include other components in addition to, or instead of, certain of those components discussed in conjunction with the FIG. 4 embodiment.

In the FIG. 4 embodiment, device software 412 may include program instructions that are executed by processor module 116 (FIG. 1) to perform various functions and operations for electronic device 112. The particular nature and functionality of device software 412 typically varies depending upon factors such as the specific type and particular functionality of the corresponding electronic device 112. In the FIG. 4 embodiment, device software 412 may include an operating system that controls and coordinates low-level functionality of electronic device 112.

In accordance with certain embodiments of the present invention, electronic device 112 may advantageously utilize immunity manager 416 to coordinate and manage an immunity mode and corresponding protection procedures, as discussed above in conjunction with FIG. 1. In the FIG. 4 embodiment, protected memory 420 may be implemented in any effective and appropriate manner to optimally provide robust and secure storage of various types of information and data for electronic device 112. For example, protected memory 420 may implemented by utilizing enhanced design and manufacturing techniques to provide a high level of reliability and security with respect to data corruption and data upsets from the effects of space radiation.

In addition, information stored in protected memory 420 may be processed by error correction module 424 by utilizing any effective techniques to ensure that all data and other information retrieved from protected memory 420 is not corrupted and is error-free. Error correction module 424 may be implemented to perform any desired error correction procedures, including, but not limited to, various types of Reed Solomon error correction procedures. The utilization of protected memory 420 during the immunity mode and corresponding protection procedures is further discussed below in conjunction with FIGS. 6 and 7.

Figure 5:
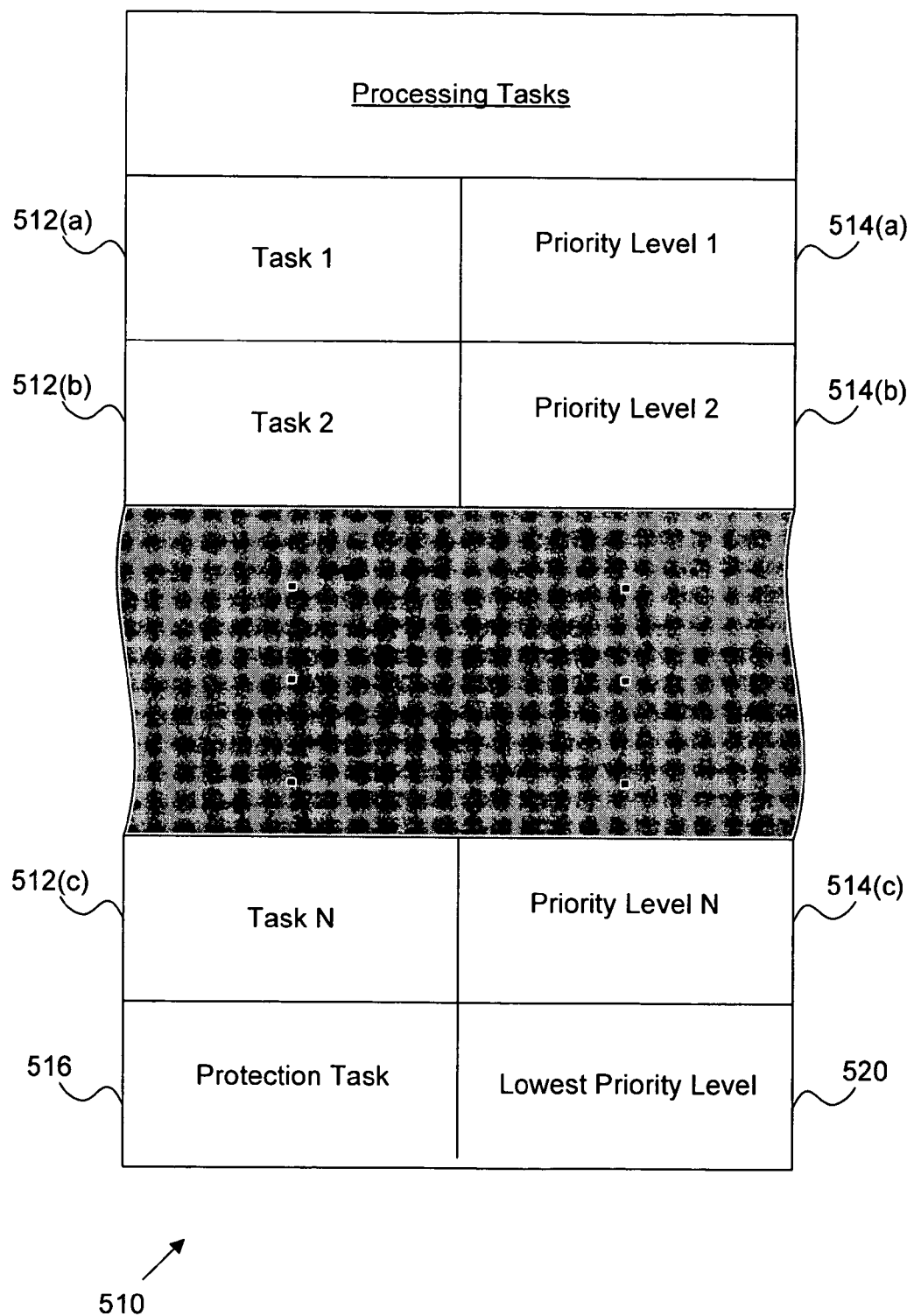
FIG. 5 is a block diagram for one embodiment of processing tasks, in accordance with the present invention.

Referring now to FIG. 5, a block diagram for processing tasks 510 of the FIG. 1 processor module 116 is shown, in accordance with one embodiment of the present invention. The FIG. 5 example is presented for purposes of illustration, and in alternate embodiments, processing tasks 510 may readily be implemented using components and configurations in addition to, or instead of, certain those components and configurations discussed in conjunction with the FIG. 5 embodiment.

In the FIG. 5 embodiment, processing tasks 510 include a series of normal tasks 512(a) through 512(c) that each has a corresponding priority level 514(a) through 514(c). In the FIG. 5 embodiment, processing tasks 510 also include a protection task 516 that corresponds to the immunity mode and corresponding protection procedures discussed above in conjunction with FIG. 1. In the FIG. 5 embodiment, protection task 516 is associated with a lowest priority level 520 which is pre-defined to be a lower level than any of the other priority levels 514 for the normal tasks 512.

In certain embodiments, processing module 116 executes processing tasks 510 according to their respective priority levels, with higher priority levels being executed before lower priority levels. Therefore, in the FIG. 5 embodiment, when all higher priority tasks 512(a) through 512(c) have been executed, processor module 116 may be defined to be in an idle state. Processor module 116 may then enter the immunity mode, and may execute protection task 516 for performing appropriate protection procedures to flush processor states and processor data from processor module 116 to protected memory 420, in accordance with the present invention. In certain embodiments, only a partial flush of the processor states may be performed.

Figure 6:
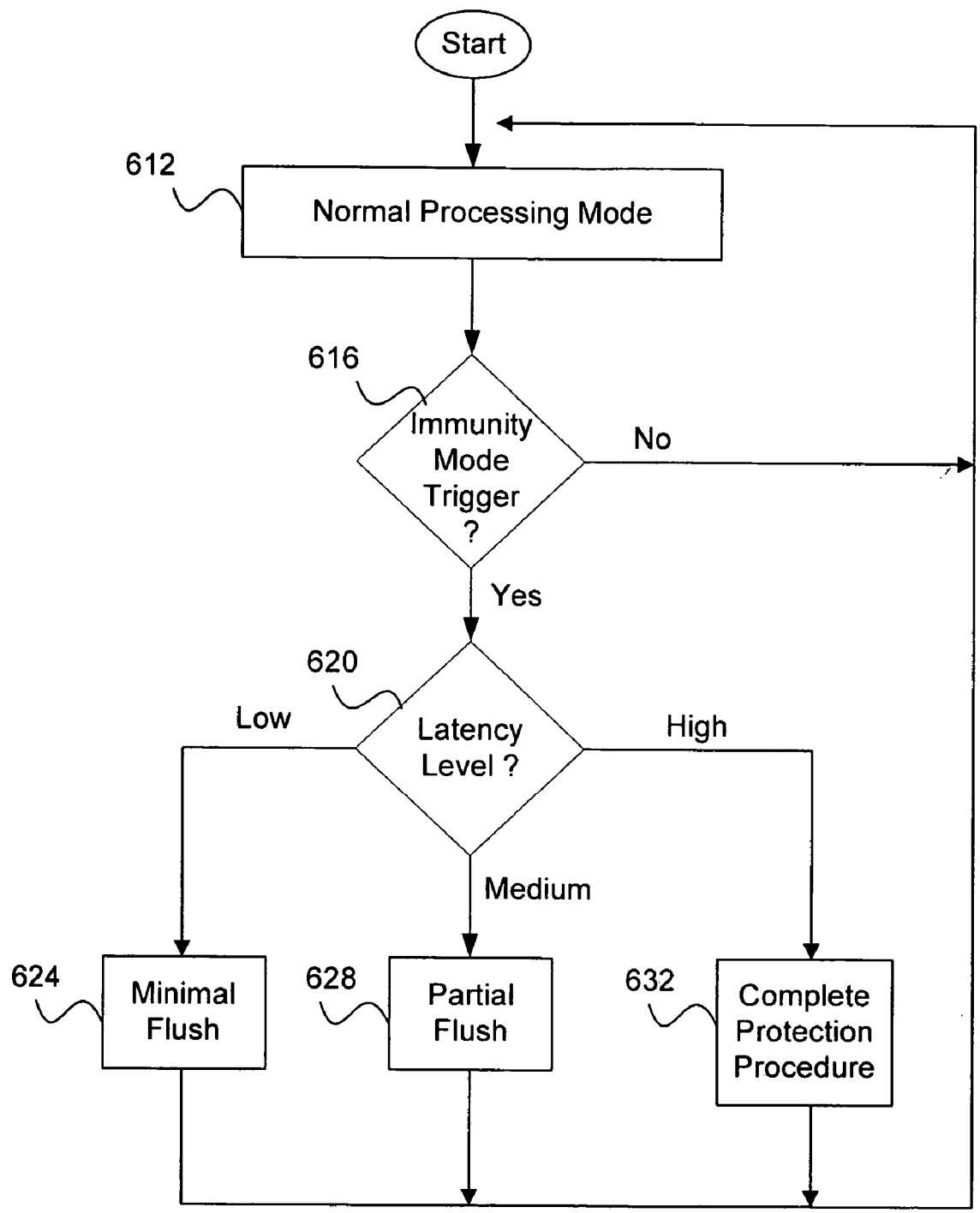
FIG. 6 is a flowchart of method steps for implementing an immunity mode, in accordance with one embodiment of the present invention.

Referring now to FIG. 6, a flowchart of method steps for implementing an immunity mode is shown, in accordance with one embodiment of the present invention. The FIG. 6 example is presented for purposes of illustration, and in alternate embodiments, the present invention may readily utilize steps and sequences other than certain of those steps and sequences discussed in conjunction with the FIG. 6 embodiment.

In the FIG. 6 embodiment, in step 612, a processor module 116 of an electronic device 112 initially functions in a normal processing mode. In step 616, processor module 116 determines whether an immunity mode trigger has occurred by utilizing any appropriate technique(s). The foregoing immunity mode trigger may be generated in response to any desired occurrence, state, or event. For example, an immunity mode trigger may result from processor module 116 entering an idle state, as discussed above in conjunction with FIG. 5. Alternately, the immunity mode trigger may result when certain predefined conditions occur, such as detection of an exceptionally hazardous operating environment or a highly sensitive use of electronic device 112. In addition, in certain embodiments, the immunity mode trigger may be affirmatively generated by a system user of electronic device 112.

If no immunity mode trigger is detected in step 616, then the FIG. 6 process may return to step 612 to continue normal processing. However, if an immunity mode trigger is detected, then, in accordance with the present invention, processor module 116 may utilize an immunity manager 416 (FIG. 4) to coordinate an immunity mode during which protection procedures may be performed to temporarily flush some or all of the vulnerable processor states and processor data from processor module 116 into a protected memory 420 (see FIG. 4).

In step 620, immunity manager 416 determines an appropriate latency level for the current immunity mode by utilizing any effective technique(s). For example, in certain embodiments, a particular type of immunity mode trigger may be associated with a predefined corresponding latency level. Alternately, latency levels may be dynamically determined by current conditions at the time of the immunity mode trigger.

In the FIG. 6 embodiment, a given latency level typically corresponds to the level of protection desired during a particular immunity mode, with a high latency level providing the maximum protection and a low latency level providing the minimum protection. In addition, a given latency level also correlates to the amount of processing disruption acceptable during a particular immunity mode, with a high latency level having the maximum disruption and a low latency level having the minimum disruption.

In the FIG. 6 embodiment, if immunity manager 416 determines that a low latency level is appropriate for the current protection procedure, then in step 624, immunity manager 416 coordinates a minimal flush procedure to transfer a minimal amount of processor information from processor module 116 to protected memory 420. The FIG. 6 process may then return to step 612, where processor module 116 may continue normal processing, and may retrieve protected processor information from protected memory 420 as needed.

In the FIG. 6 embodiment, if immunity manager 416 determines that a medium latency level is appropriate for the current protection procedure, then in step 628, immunity manager 416 coordinates a partial flush procedure to transfer a moderate amount of information from processor module 116 to protected memory 420. The FIG. 6 process may then return to step 612, where processor module 116 may continue normal processing, and may retrieve protected processor information from protected memory 420 as needed.

In the FIG. 6 embodiment, if immunity manager 416 determines that a high latency level is appropriate for the current protection procedure, then in step 632, immunity manager 416 coordinates a complete protection procedure to transfer all information from processor module 116 to protected memory 420. One embodiment for performing the complete protection procedure is further discussed below in conjunction with FIG. 7. Following the complete protection procedure, the FIG. 6 process may then return to step 612, where processor module 116 may resume processing in a normal processing mode. For at least the foregoing reasons, the present invention therefore provides an improved system method for effectively implementing an immunity mode in an electronic device.

Figure 7:
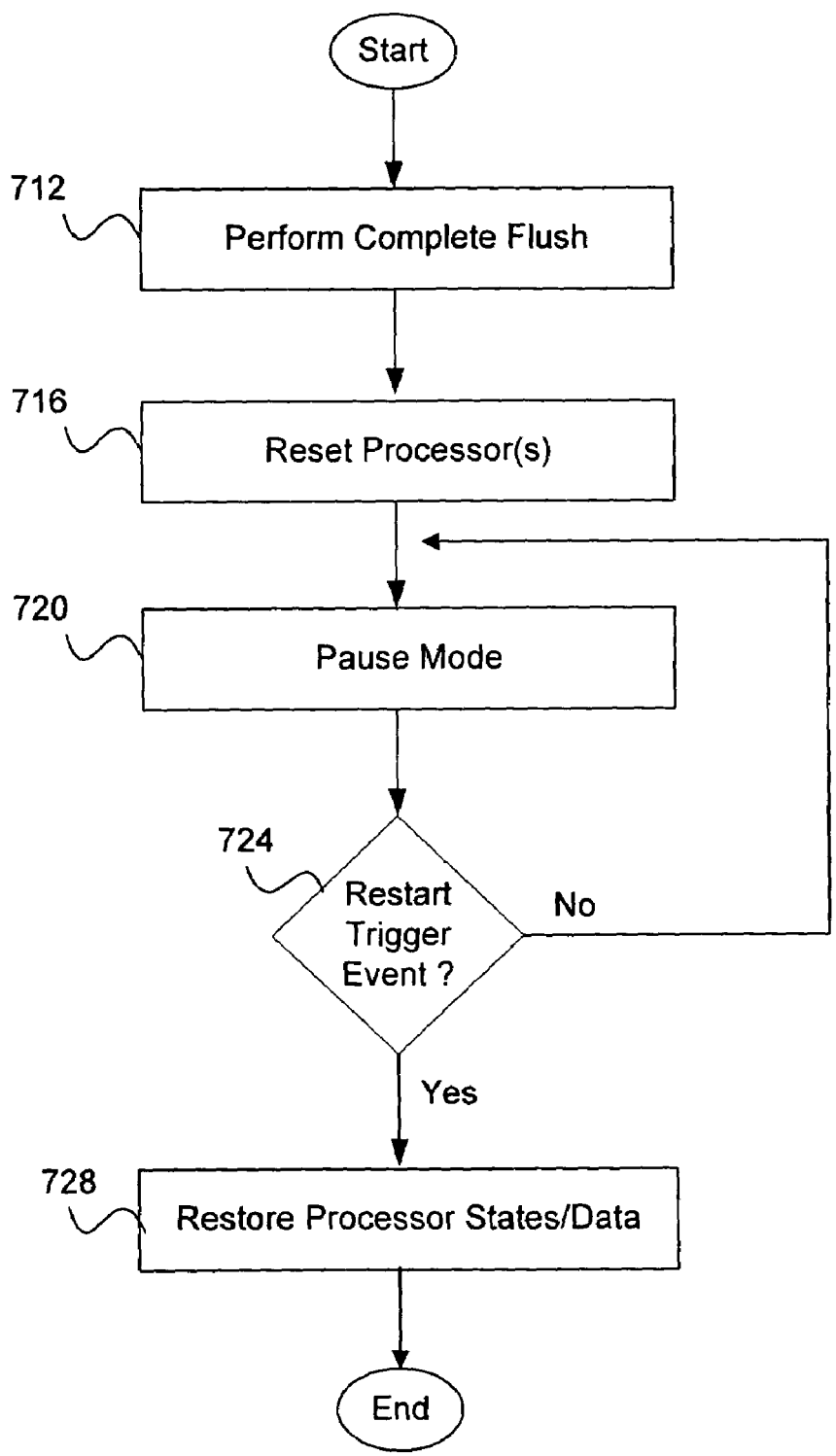
FIG. 7 is a flowchart of method steps for performing a complete protection procedure, in accordance with one embodiment of the present invention.

Referring now to FIG. 7, a flowchart of method steps for performing a complete protection procedure is shown, in accordance with one embodiment of the present invention. The process and techniques disclosed in conjunction with FIG. 7 correspond to one embodiment for performing the complete protection procedure referred to above in step 632 of the FIG. 6 embodiment. The FIG. 7 example is presented for purposes of illustration, and in alternate embodiments, the present invention may readily utilize steps and sequences other than certain of those steps and sequences discussed in conjunction with the FIG. 7 embodiment.

In the FIG. 7 embodiment, in step 712, immunity manager 416 coordinates a complete flush procedure to transfer all processor states and processor data from processor module 116 to protected memory 420. Then, in step 716, electronic device 112 resets the processor(s) of processor module 116. In step 720, in accordance with the present invention, processor module 116 may then enter a pause mode during which no processing tasks are performed, and all protected processor information (processor states and processor data) remains safely in protected memory 420. In certain embodiments, processor module 116 may be powered down to save power during the immunity mode, and powered back up when additional processing is required.

In step 724, immunity manager 416 determines whether a restart trigger event has occurred by utilizing any effective means. The foregoing restart trigger event may be generated in response to any desired occurrence, state, or event. For example, a restart trigger event may result when processor module 116 leaves an idle state because one or more new unexecuted tasks require processing, as discussed above in conjunction with FIG. 5. Alternately, the restart trigger event may result when certain predefined conditions no longer exist. In addition, in certain embodiments, the restart trigger event may be affirmatively generated by a system user of electronic device 112.

In step 724, if immunity manager 416 fails to detect a restart trigger event, then the FIG. 7 process may remain in the pause mode of step 720. However, if immunity manager 416 detects a restart trigger event, then in step 728, immunity manager 416 may coordinate a processor restoration procedure during which the protected processor information (e.g., processor states and processor data) is restored from protected memory 420 to processor module 116 for resuming normal processing functions. The FIG. 7 complete protection procedure may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an immunity mode in an electronic device, comprising:
 a processor module that executes processing tasks of said electronic device, said processor module including processor information for executing said processing tasks;
 a protected memory coupled to said electronic device for storing electronic information in a manner that is more secure than if stored in said processor module; and
 an immunity manager that performs one or more protection procedures to store at least a portion of said processor information into said protected memory in response to an immunity mode trigger events,
 wherein said immunity manager detects an idle state of said processor module for performing said one or more protection procedures whenever all of said processing tasks have currently been executed, said immunity manager detecting said idle state of said processor module by comparing higher priority levels of any unexecuted ones of said processing tasks with a lowest priority level of a protection task.

2. The system of claim 1 wherein said electronic device is implemented in a space operating environment.

3. The system of claim 1 wherein said processor information is vulnerable to single-event upsets from ambient space radiation, said single-event upsets corrupting one or more digital bits in said processor information whenever said processor information is not stored in said protected memory.

4. The system of claim 1 wherein said processor information includes processor states, processor data, and device data for performing said processing tasks and related device functions for said electronic device.

5. The system of claim 1 wherein said protected memory is designed and manufactured to provide increased reliability for storing said processor information, said protected memory operating with an error correction module to ensure that said processor information has a lower probability of error when retrieved from said protected memory.

6. The system of claim 1 wherein said processor module provides said processor information to a controller that transfers said processor information to said protected memory during said one or more protection procedures of said immunity mode.

7. The system of claim 1 wherein said immunity mode trigger event is generated by an idle state of said processor module during which said processor module has executed all current instances of said processing tasks.

8. The system of claim 1 wherein said immunity mode trigger is generated by detecting at least one occurrence of a predefined hazardous operating condition for said electronic device.

9. The system of claim 1 wherein said processor module includes a plurality of redundant processor devices operating in exact synchronization to provide respective processor output signals, said respective processor output signals being compared by a voting module to generate a majority output signal, said electronic device including an error detection module that initiates a resynchronization procedure for said redundant processor devices whenever any of said respective processor output signals differs from said majority output signal.

10. The system of claim 1 wherein said processor module is powered down after said immunity mode trigger event, said processor module being powered back up when additional processing tasks are required.

11. A system for implementing an immunity mode in an electronic device, comprising:
- a processor module that executes processing tasks of said electronic device, said processor module including processor information for executing said processing tasks;
- a protected memory coupled to said electronic device for storing electronic information in a manner that is more secure than if stored in said processor module; and
- an immunity manager that performs one or more protection procedures to store at least a portion of said processor information into said protected memory in response to an immunity mode trigger event,
- wherein said immunity module determines a latency level for said immunity mode, said latency level corresponding to a protection level desired during said immunity mode, said latency level also corresponding to an amount of processing disruption that is acceptable during said immunity mode.

12. The system of claim 11 wherein said immunity module selects a low latency level to store only a minimal amount of said processor information to said protected memory, said processor module continuing to execute said processing tasks, said processor module retrieving said minimal amount of said processor information from said protected memory as needed.

13. The system of claim 12 where said minimal amount of said processor information includes processor data from processor cache of said processor module.

14. The system of claim 11 wherein said immunity module selects a medium latency level to store a moderate amount of said processor information to said protected memory, said processor module continuing to execute said processing tasks, said processor module retrieving said moderate amount of said processor information from said protected memory as needed.

15. The system of claim 11 wherein said immunity module selects a high latency level for said immunity mode, said immunity module then responsively coordinating a complete protection procedure for all of said processor information.

16. A system for implementing an immunity mode in an electronic device, comprising:
- a processor module that executes processing tasks of said electronic device, said processor module including processor information for executing said processing tasks;
- a protected memory coupled to said electronic device for storing electronic information in a manner that is more secure than if stored in said processor module; and
- an immunity manager that performs one or more protection procedures to store at least a portion of said processor information into said protected memory in response to an immunity mode trigger event,
- wherein said immunity manager performs a complete flush of all of said processor information to said protected memory in response to said immunity mode trigger event, said electronic device then placing said processor module in a reset state,
- wherein said electronic device holds said processor module in a pause mode during which said processor information is securely stored in said protected memory, and
- wherein said immunity module detects a restart trigger event for terminating said immunity mode of said processing module, said restart trigger event being generated by detecting a new unexecuted one of said processing tasks, said processor module therefore no longer being in an idle state, said protected memory restoring said processor information to said processor module for resuming a normal processing mode to execute said processing tasks.

17. A method for implementing an immunity mode in an electronic device, comprising:
- executing processing tasks of said electronic device with a processor module that includes processor information for executing said processing tasks;
- providing a protected memory that is coupled to said electronic device to store electronic information in a manner that is more secure than if stored in said processor module;
- performing one or more protection procedures with an immunity manager to store at least a portion of said processor information into said protected memory in response to an immunity mode trigger event, and
- detecting an idle state of said processor module with said immunity manager for performing said one or more protection procedures whenever all of said processing tasks have currently been executed, the detecting operation being performed by detecting said idle state of said processor module by comparing higher priority levels of any unexecuted ones of said processing tasks with a lowest priority level of a protection task.

18. A method for implementing an immunity mode in an electronic device, comprising:
- executing processing tasks of said electronic device with a processor module that includes processor information for executing said processing tasks;
- providing a protected memory that is coupled to said electronic device to store electronic information in a manner that is more secure than if stored in said processor module;
- performing one or more protection procedures with an immunity manager to store at least a portion of said processor information into said protected memory in response to an immunity mode trigger event, and
- determining a latency level for said immunity mode via said immunity module, said latency level corresponding to a protection level desired during said immunity mode, said latency level also corresponding to an amount of processing disruption that is acceptable during said immunity mode.

19. A method for implementing an immunity mode in an electronic device, comprising:
- executing processing tasks of said electronic device with a processor module that includes processor information for executing said processing tasks;
- providing a protected memory that is coupled to said electronic device to store electronic information in a manner that is more secure than if stored in said processor module;
- performing one or more protection procedures with an immunity manager to store at least a portion of said processor information into said protected memory in response to an immunity mode trigger event,
- performing a complete flush of all of said processor information to said protected memory in response to said immunity mode trigger event, then placing said processor module in a reset state,
- holding said processor module in a pause mode during which said processor information is securely stored in said protected memory, and
- detecting a restart trigger event for terminating said immunity mode of said processing module, said restart trigger event being generated by detecting a new unexecuted one of said processing tasks, said processor module therefore no longer being in an idle state, said protected memory restoring said processor information to said processor module for resuming a normal processing mode to execute said processing tasks.

* * * * *